Dec. 22, 1936.  M. LOUGHEAD  2,065,084
BRAKE MECHANISM
Filed Aug. 19, 1931

Inventor:
Malcolm Loughead
By
Williams, Bradbury,
McCaleb & Hinkle.
Attys.

Patented Dec. 22, 1936

2,065,084

UNITED STATES PATENT OFFICE 2,065,084

BRAKE MECHANISM

Malcolm Loughead, Los Angeles, Calif., assignor to Hydraulic Brake Company, Los Angeles, Calif., a corporation of California Application August 19, 1931, Serial No. 557,984

19 Claims. (Cl. 188—79.5)

This invention relates to brake mechanism and will be described as embodied in a two-shoe hydraulically actuated brake mechanism, the shoes of which are of multiple piece construction.

This application is a continuation in part of my patent application Serial Number 217,582 filed September 6, 1927, now Patent No. 1,915,857, issued June 27, 1933.

An object of this invention is the provision of a brake mechanism incorporating an adjustable stop means for limiting the retractile movement of the brake shoes when the actuating pressure is released.

Another object is the provision of such a mechanism in which the heating of the brake shoe means automatically effects an adjustment in the retractile movement of the brake shoe to compensate for the expansion of the brake drum.

Other objects and advantages of this invention will become apparent from the following description.

In the accompanying drawing.

Figure 1:
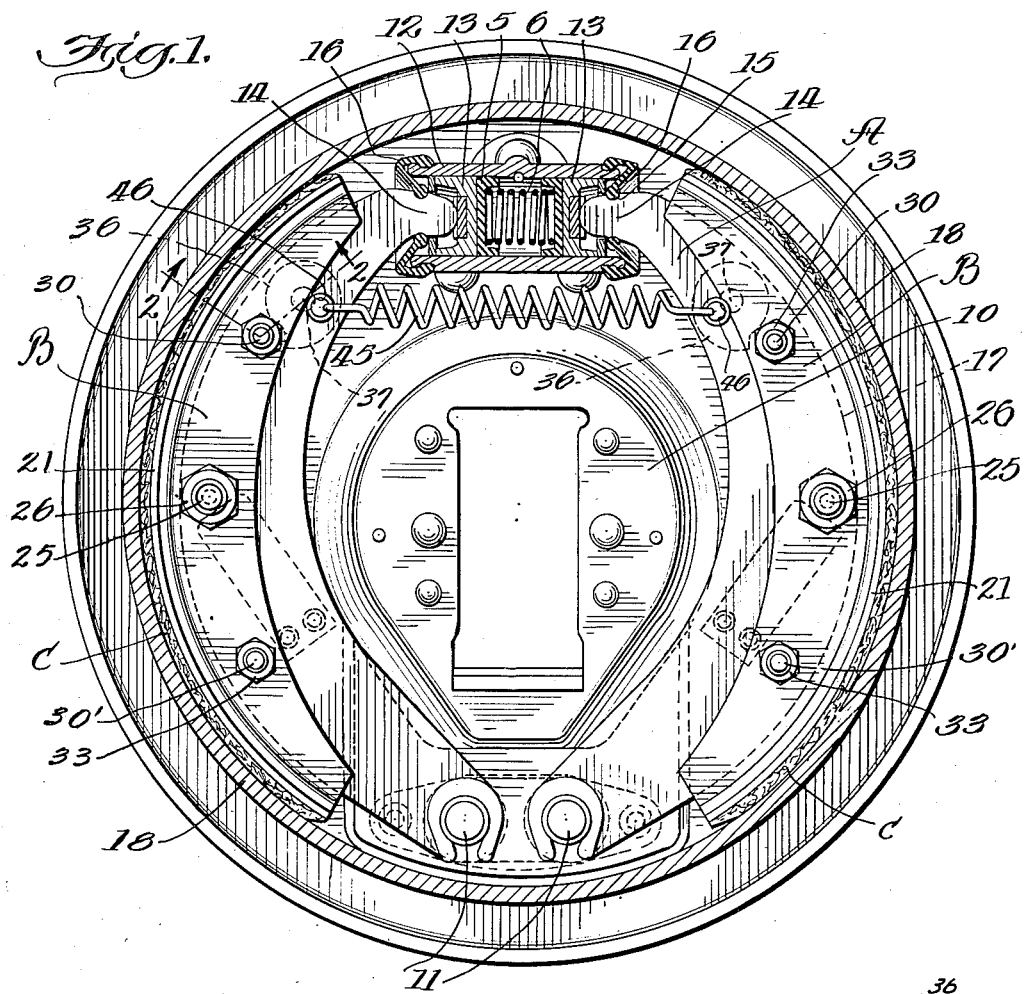
Figure 1 is a side elevation of a vehicle brake mechanism embodying my invention and showing parts thereof in section.

The vehicle brake as illustrated in the drawing comprises a rear face plate or shield 10 to which brake shoe anchor pins 11 are secured which project laterally for mounting the plates A, and a hydraulic brake shoe actuating cylinder 12 having a pair of pistons 13 which are operatively engaged with the free ends 14 of the actuating plates A.

Adjacent the ends of the actuating plates are provided recesses 15 in which are seated the inner edges of the flexible boots 16, the outer edges of which embrace the open ends of the cylinder to exclude dust and dirt from the cylinder.

In my prior Patent No. 1,507,389 issued September 2, 1924, for Braking apparatus, is shown such mechanism as may be used for supplying fluid pressure for the cylinder 12 for the purpose of actuating the brakes.

The plates A are of such contour as to present their outer edges 17 concentric with the brake drum 18 which is fixed to a vehicle wheel not shown. Segmental supporting members B are complementary in contour, one intended for engagement with each face of the plate A. Offset portions 20 of the segmental supporting members contact with one another at a point immediately beyond the outer edge 17 of the plate A. The outermost edges of the members B are bent laterally so as to form contiguous brake lining supporting surfaces 21 conforming in curvature to the brake drum 18. The brake lining C is secured to the supporting surfaces 21 by any well known process.

A relatively large bolt 25 is projected through the members B and plate A at a point substantially equally spaced from both ends of the members B. A nut 28 is employed to securely hold the bolt in place and to bind the supporting member B into close engagement with the plate A.

A pair of bolts 30 and 30' smaller in size than the bolt 25, are disposed at opposite sides of the bolt 25 and at points substantially midway between the bolt 25 and the ends of the supporting members B. The bolts 30 and 30' are projected through aligned openings 31 in the members B of a diameter just sufficient to permit the projection of the bolts therethrough and through a slot 32 in the plate A extending transverse to an intersecting radial line drawn from the bolt 25. Nuts 33 and lock washers 34 on the bolts 30 and 30' serve as means for drawing the adjacent portions of the supporting members B into engagement with the plate A and secure the same against movement relative thereto.

Figure 2:
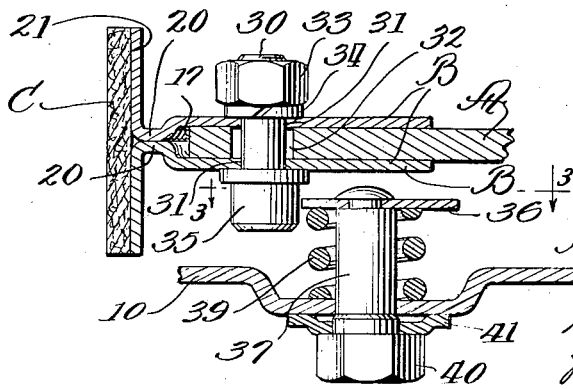
Figure 2 is a section taken on the line 2—2 of Figure 1.

The bolt 30 which is nearest to the free end of the shoe has an elongated head 35 which performs the additional function of serving as a stop engaging member for the shoe. The stop with which the head 35 of the bolt 30 engages is adjustable and comprises a cam disc 36 secured to one end of a pillar or stud 37 by having the end of the stud securely riveted over onto the upper face of the disc 36, as illustrated in Figure 2. The stud 37 extends through the shield 10, and for the purpose of holding it in position there is provided a relatively rigid compression spring 39 which is disposed between the cam 36 and the shield 10 concentric with the axis of the stud. The pillar or stud 37 is provided with a head 40 of non-cylindrical contour to which a wrench may be applied for rotating the same. To the head 40 is suitably fixed a friction member or disc 41 which has its marginal edge offset sufficiently to provide firm frictional engagement with the shield 10 so as to normally hold the pillar 37 against rotation. The compression spring 39 is sufficiently powerful to prevent rotation of the pillar under normal operating conditions of the brake, but the pillar may be rotated for changing the portion of the cam 36 disposed adjacent to the head 35 of the bolt 30 for adjusting the limit of retractile movement of the shoe, by applying a suitable wrench to the head 40 and exerting a sufficient rotative force thereto.

The design of the disc cam 36 is such that by correct adjustment it is adapted to limit the retractile movement of the bolt 30, and thus the brake shoe at such a point, to compensate for the heating of the brake drum and shoe. When the brake drum becomes heated as a result of friction with the lining of the shoes it expands and moves away from the shoes. As the heat from the drum is communicated to the shoes they also expand to a somewhat lesser extent and become elongated, increasing the length of the shoes between the anchor pins 11 and the stop heads 35 on the bolts 30, with the result that the stop heads strike the cam discs at points on the peripheries of the discs nearer to the drum. The slope of the peripheries is such that a slight elongation of the shoes causes relatively great movement of the shoes toward the drum, thereby maintaining the amount of clearance between the shoes and the drum relatively constant and within permissible limits as the drum expands.

Figure 3:
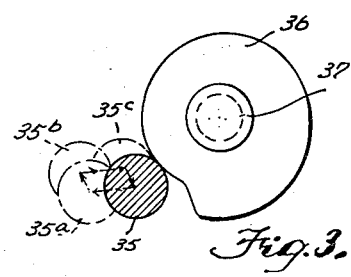
Figure 3 is a sectional view taken on the line 3—3 of Figure 2.

This is best shown in Figure 3. In this figure the numeral 35 indicates the position of the stop when it is in the normal "off" position. When the brakes are applied the stop moves to the position 35ᵃ. In a prolonged application of the brakes the heating of the brake shoe and its subsequent elongation moves the stop to the position indicated at 35ᵇ, and when the brakes are released this stop is returned by the retractile spring 45 to the position 35ᶜ. As the brake shoes and drum cool down the stop returns to its original position indicated at 35.

This feature is of great value in the operation of hydraulic brakes, especially in systems of the type disclosed in the United States patent to Malcolm Loughead and Erwin Loweke, No. 1,758,671, issued May 13, 1930, in which the length of travel of the foot pedal depends upon the clearance between the shoes and the brake drum. When no means is provided to compensate for drum expansion, the clearance or lost motion may increase to such proportion as to require an extremely large pedal movement. The amount of movement of the shoes toward the drum depends not only upon the amount of elongation of the shoes, but upon the angle between the arcs of movement of the shoes and the slope of the discs at the points of contact by the stop heads 35 which are fixed to the shoes.

For returning the shoes to their retracted position and maintaining them in such position when actuating force of the pistons 13 is released, I have provided a tension spring 45 having its opposite ends hooked through openings 46 in the plates A adjacent their free ends. As the sealing cups 5 are held on the face of the pistons 13 by a compression spring 6 it is necessary that the tension spring 45 be sufficiently powerful to overcome the compression spring 6 when fluid pressure is released from the cylinder so that the pistons 13 will move to their innermost positions and be prepared for outward actuation upon admission of fluid pressure to the cylinder 12.

While I have herein illustrated and described a preferred form of my invention, I desire to avail myself of such modifications and variations thereof within the principle of my invention as come within the scope of the appended claims.

I claim as my invention:

1. In a brake mechanism a stationary support, brake shoe means movably mounted thereon, a stop element projecting from said shoe means at a point spaced inwardly from the periphery thereof, and compensating mechanism for maintaining the degree of brake pedal travel necessary for applying the brakes relatively constant, including means associated with said stop element for limiting the retractile movement of said shoe means upon release of the brakes, comprising a stud including a head disposed on one side of said plate and a body extending through said plate, an eccentric stop member on the end of said body rigidly fixed thereto and disposed in the path of movement of said stop element both upon release of the brakes and upon expansion of said shoe means due to heat, a disc member fixed to said head and comprising an offset marginal flange frictionally engaging said plate, and a compression spring surrounding said body and frictionally engaging said stop member and said plate to restrain relative movement thereof.

2. A brake mechanism comprising a brake drum, a brake shoe, a pivotal mounting for the brake shoe, a stop member carried by the brake shoe, and a stationary cam adapted to engage the shoe in its retracted position, said cam having a surface of such slope as to cause the shoe to move toward the drum when the shoe expands due to heat.

3. A brake mechanism comprising a brake drum, a stationary support, a brake shoe pivotally mounted thereon, a stop member secured to the shoe, and a cam secured to said support and having a surface sloping toward the drum whereby the elongation of the shoe causes it to move toward the drum.

4. A brake mechanism comprising a brake drum, a stationary support, a brake shoe pivotally mounted thereon, a disc having a curved periphery mounted on said support, and a stop member carried by the shoe and engaging the curved surface disc in the retracted position of the shoe, the curvature of the disc being such that the elongation of the shoe causes it to move toward the drum.

5. A brake mechanism comprising a rotatable brake drum, a stationary support, a shoe pivotally mounted on the support, a stop member carried by the shoe, a disc having a spirally shaped periphery engaging said stop member in the retracted position of the shoe, and means for adjusting said disc to initially position the shoe with respect to the drum, the curvature of the disc being such as to cause the shoe to approach the drum when the shoe is expanded due to heat.

6. A brake mechanism comprising a rotatable drum, a stationary support, a brake shoe pivotally mounted on the support, a disc having a curved surface mounted upon the support, and a stop member secured to the shoe and engaging the disc at a point where its slope is small with respect to the arc of movement of the stop member whereby a small elongation of the shoe will produce a large movement of the shoe toward the drum.

7. A brake mechanism comprising a brake drum, a stationary disc-like backing plate, a brake shoe pivotally mounted thereon, a stop member secured to said shoe, a cam secured to said backing plate and having a surface sloping toward said drum and adapted to engage said stop member, whereby the elongation of the shoe causes it to move toward the drum.

8. A brake mechanism comprising a brake drum, a stationary backing plate, a brake shoe pivotally mounted thereon and compensating mechanism for maintaining the degree of brake pedal travel necessary for applying the brakes relatively constant, including a disc having a curved periphery mounted on said backing plate, a stop member carried by said shoe engaging the curved surface disc in the retracted position of the shoe, the curvature of the disc being such that elongation of the shoe causes it to move toward the drum.

9. A brake mechanism comprising a rotatable brake drum, a stationary disc-like member substantially closing the open face of said drum, a shoe pivotally mounted on said disc-like member, and compensating mechanism for maintaining the degree of brake pedal travel necessary for applying the brakes relatively constant, including a stop member carried by the shoe, a disc having a spirally shaped periphery engaging said stop member in the retracted position of the shoe, and means for adjusting said disc to initially position the shoe with respect to the drum, the curvature of the disc being such as to cause the shoe to approach the drum when the shoe is expanded due to heat.

10. In braking apparatus of the class described, the combination of a first brake member, a support adjacent said member, a second brake member mounted on said support for movement toward and from said first brake member, means for moving said second brake member, an adjustable stop for limiting separation of said members, said stop having a surface of such slope as to cause said second brake member to move toward said first brake member when the former expands due to heat, said stop carried by said support and having a part extending through said support and provided with means adapted for engagement by a tool for the purpose of adjusting said stop, and resilient means for holding said stop in adjusted position.

11. In braking apparatus of the class described, the combination of a brake drum, a support closing the open end of said drum, a brake member mounted on said support for movement toward and from said drum, means for moving said brake member, an adjustable stop for limiting separation of said member from said drum, said stop having a surface of such slope as to cause said brake member to move toward the drum when the brake member expands due to heat, said stop carried by said support and having a part projecting therethrough to permit adjustment of said stop at a point exterior of said drum and support, and resilient means for holding said stop in adjusted position.

12. In braking apparatus of the class described, the combination of a brake drum, a support enclosing the open end of said drum, a brake member mounted on said support for movement toward and from said drum, means for moving said brake member, a rotatable cam for adjustably limiting separation of said member from said drum, said cam having a surface of such slope as to cause the brake member to move toward the drum when the brake member expands due to heat, a stud rigidly attached to said cam, said stud projecting through said support and having a part on the side of said support opposite said cam adapted for manipulation to move said cam to adjusted position, and a spring confined between said cam and said support for holding said cam in adjusted position.

13. In brake mechanism of the class described, the combination of a brake drum, a support adjacent said drum, a pair of pivots mounted on said support, a hydraulic cylinder mounted on said support diametrically opposite said pivots, a brake shoe mounted on each pivot, each shoe having an end of reduced cross-section extending into said cylinder, said end and the pivotal center of its shoe normally being about equally spaced from a diameter of said drum, said ends being rounded and provided with notches, flexible boots engaging said cylinder and said notched ends, pistons in said cylinder engaging said ends to apply said shoes against said drum, a spring for retracting said shoes, and stop means for limiting the retractile movements of said shoes.

14. In brake mechanism of the class described, the combination of a brake drum, a support adjacent said drum, a pair of pivots mounted on said support, a cylinder mounted on said support diametrically opposite said pivots, a pair of brake shoes, each shoe including a web having an opening at one end for receiving one of said pivots, and a second end rounded and of reduced diametral width for extending into one end of said cylinder, said last-named end and said last-mentioned pivot being substantially equally spaced from a diameter of said drum, pistons in said cylinder in abutting engagement with the rounded ends of said shoes, said pistons adapted to apply said shoes against said drum, and means for retracting said shoes.

15. In brake mechanism of the class described, the combination of a brake drum, a support adjacent said drum, a pair of pivots mounted on said support, a cylinder mounted on said support diametrically opposite said pivots, a pair of brake shoes mounted on each pivot, each shoe including a web portion having an opening receiving one of said pivots, and an end of reduced diametral width extending into an end of said cylinder, pistons in said cylinder engaging the last-mentioned ends of said shoes to apply said shoes against said drum, and means for retracting said shoes.

16. In mechanism of the class described, a brake shoe including a web portion having an opening at one end for receiving a pivot, and having a second end of reduced diametral width and extending to a point almost diametrically opposite the center of said opening, said last-mentioned end being rounded to form a contact engagement with an operating element throughout the pivotal movement of said shoe, said last-named end being notched to provide an effective engagement with a flexible boot.

17. In mechanism of the class described, a brake shoe having one end provided with a circular opening for receiving a pivot and a second projecting end of reduced diametral width for extending into an actuating cylinder, said last-mentioned end being conformed to establish a contact connection with an actuating piston in said cylinder, said last-named end extending in a direction normal to a diameter of said opening.

18. In a brake mechanism, a stationary backing plate, a movable shoe mounted thereon, and compensating mechanism for maintaining the degree of brake pedal travel necessary for applying the brakes relatively constant including means for limiting the retractile movement of the shoe upon release of the brakes comprising a stud including a head disposed on one side of said plate and a body extending through said plate, an eccentric stop member on one end of said body rigidly fixed thereto and disposed for operative engagement with said shoe, said eccentric stop member having a surface of such slope as to cause the shoe to move toward the drum when the shoe expands due to heat, a disk member fixed to said head and comprising an offset marginal flange frictionally engaging said plate, and a compression spring surrounding said body and frictionally engaging said stop member and said plate to restrain relative movement thereof.

19. In braking apparatus of the class described, the combination of a first brake member, a support, a second brake member mounted on said support for movement toward and from said first brake member, means for moving said second brake member, a cam for limiting separation of said members, said cam having a surface of such slope as to cause said second brake member to move toward said first brake member when the second brake member expands due to heat, a bolt on which said cam is rigidly mounted whereby said cam may be rotated to different adjusted positions, and resilient means for holding said cam in adjusted position.

MALCOLM LOUGHEAD.